United States Patent [19]

Wheeler

[11] 3,775,882
[45] Dec. 4, 1973

[54] TAG
[75] Inventor: Philip T. Wheeler, Dewitt, Mich.
[73] Assignee: The Hardy Company, Lansing, Mich.
[22] Filed: Dec. 22, 1971
[21] Appl. No.: 210,957

[52] U.S. Cl. ................................. 40/10 C
[51] Int. Cl. ................................. G09f 3/18
[58] Field of Search ............... 40/10 C, 21 R, 2 R, 40/22, 20

[56] References Cited
UNITED STATES PATENTS

| 1,430,641 | 10/1922 | Ginn | 40/20 R |
| 529,873 | 11/1894 | McDermut | 40/20 R |
| 1,984,589 | 12/1934 | Ludy | 40/21 R |
| 2,016,059 | 10/1935 | Stevens | 40/21 R |
| 2,095,195 | 10/1937 | Macdonald | 40/2 R X |

FOREIGN PATENTS OR APPLICATIONS

| 1,468,567 | 12/1966 | France | 40/21 R |
| 459 | 8/1889 | Great Britain | 40/21 R |

Primary Examiner—Robert W. Michell
Assistant Examiner—Wenceslao J. Contreras
Attorney—Price, Heneveld, Huizenga & Cooper

[57] ABSTRACT

A tag for identifying or describing objects such as plants or other nursery stock is formed by stamping a pattern from a flexible sheet material and including in the pattern a crescent-shaped aperture adapted to receive a barbed tab. The tab is on the end of an arm formed in the body of the tag and forms an opening through which a stalk of the plant or the like passes when the tag is attached to the plant. The crescent-shaped aperture is uniquely shaped together with the barbed tab to securely hold the arm in place around the stalk when the tag is attached thereto.

6 Claims, 5 Drawing Figures

PATENTED DEC 4 1973 3,775,882

TAG

BACKGROUND OF THE INVENTION

The present invention relates to a tag adapted to be attached around an object, and particularly to novel securing means for holding the tag in position.

It is frequently necessary to tag nursery plants or the like with identification, prices, or other information. Prior methods of attaching tags to the plants have included a tag with a reinforced grommet through which a wire is strung. The wire is then wrapped around the stem of the plant. Some tags employ string providing the same function. More recently, tags have been used which are relatively narrow and have an aperture in one end such that the tag body can be wrapped around the stem of a plant or other object and the end opposite the aperture extended through the aperture thereby forming an attaching loop. In such an arrangement, the protruding end of the tag carries printed information. Other tags have either used separate means for attaching the tag, or are relatively difficult to place on the plant. In addition to being relatively expensive, many tags are either difficult to remove once attached or alternatively can work loose and easily fall off.

SUMMARY OF THE INVENTION

The tag of the present invention, however, incorporates a novel means for attaching the tag to a plant by providing an arm having a barbed-shaped tab at the free end thereof. The tag includes a crescent-shaped aperture adapted to receive the tab at the free end of the arm after the arm has been positioned around an object to securely lock the arm to the body of the tag. Such an arrangement prevents the loosening of the tag during use and provides an inexpensive tag which can easily be placed on a plant or the like and which is securely attached thereto.

Other embodiments of the present invention incorporate an arm formed at one end of the tag and which extends along the side of the tag such that the arm will be somewhat longer and can accommodate larger sized items between the body portion of the tag and the arm.

In still a further embodiment, the arm is formed in the shape of a plurality of convolutions at one end of the tag such that the arm can be extended in accordion-like fashion around a relatively large object and the barbed-shaped tab at the end thereof inserted into the crescent-shaped locking aperture in the body portion of the tag.

DETAILED DESCRIPTION OF THE FIGURES

Figure 1:
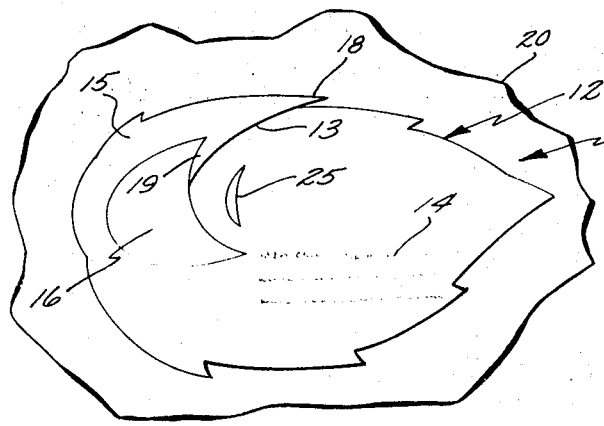
FIG. 1 is a plan view of the tag embodying the present invention showing the pattern in which it is stamped.
Figure 2:
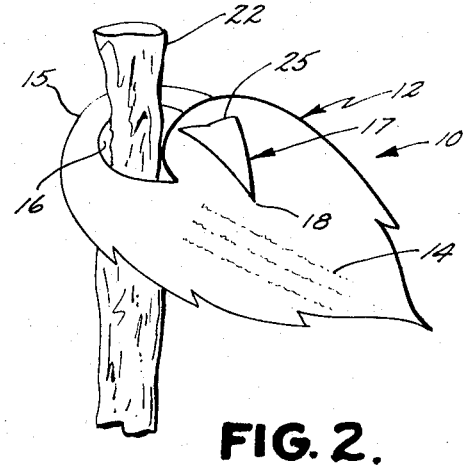
FIG. 2 is a perspective view showing the tag attached to the stem of a plant and illustrating the locking of the barbed-shaped tab on the arm within the crescent-shaped aperture of the body portion of the tag.

Referring now to FIGS. 1 and 2, there is shown a tag 10 which can be stamped from a suitable material 20 which in the preferred embodiment is sheet plastic. A spun-bonded plastic fiber sheet could likewise be employed such that the tag and identifying information thereon is weather-resistant. The tag 10 can be stamped from a sheet of the material 20 by any suitable stamping machinery and can take any variety of shapes. The leaf shape shown in FIGS. 1 and 2 illustrates the broad flexibility of design possible to achieve by proper combination of printing and die cut shape. The tag shown is particularly well suited for nursery tagging applications.

Tag 10 comprises a body 12 on which various information 14 can be printed during the manufacture of the tag 10 or can be individually written on appropriate lines printed on the tag by the user. An aperture 16 is formed at one end of the tag such that an arm 15 which circumscribes a portion of the body 12 is formed by a peripheral portion of the boundary of aperture 16. At the free end of arm 15, a barbed-shaped tab 17 is formed. The tab 17 has a point 18 and an outwardly extending projection 19 and is separated from the body 12 of the tag by a cut or slot 13 such that the arm 15 and tab 17 are free to be moved.

Adjacent the aperture 16 there is formed in the body 12 of the tag 10 a crescent-shaped aperture 25 which is adapted to receive the tab 17. As shown in FIG. 2 the point 18 of tab 17 is fitted within the crescent-shaped aperture from either the top or the bottom (as shown) of the body 12 of tag 10. The tab 17 is then forced through aperture 25 until the projection 19 clears the aperture 25 and locks the arm 15 into place around the stem 22 of a plant as shown for example in FIG. 2. Since the edges of the aperture 25 are arcuately shaped, the barbed tab 17 can easily be inserted into the aperture 25 but is held within the aperture 25 by the projection 19 such that it cannot easily become disengaged therefrom once the tag has been attached.

Figure 3:
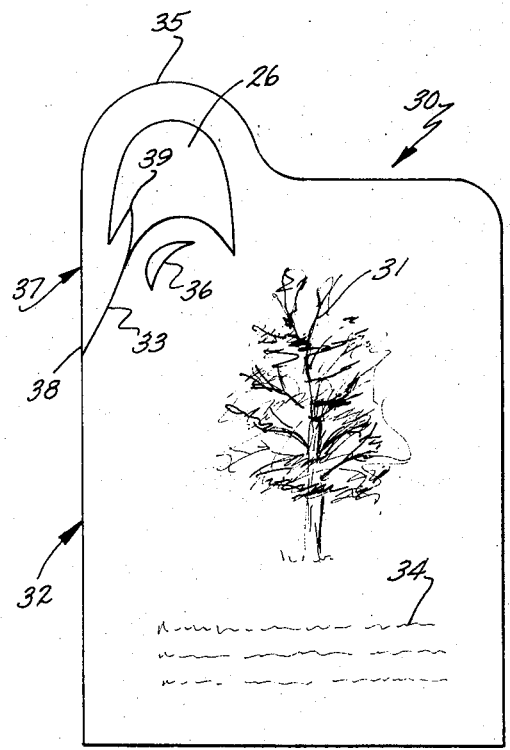
FIG. 3 is an alternative embodiment of the present invention showing its use with a relatively large tag and having a somewhat elongated arm.

FIG. 3 shows an alternative embodiment of the present invention in the form of a tag 30 having a relatively large rectangular body 32 on which can be printed information 34 as well as a pictoral representation 31 of a plant, tree, or the like to which the tag is attached. Tag 30 can be formed by stamping the tag from material such as described with regard to the embodiment shown in FIGS. 1 and 2. An aperture 26 is formed at one corner of the tag 30 such that an arm 35 which circumscribes a portion of the body 32 of tag 30 is defined by a peripheral portion of the boundary of the aperture 26. A barbed-shaped tab 37 at the end of arm 35 has a point 38 and a projection 39. A slot 33 separates the tab 37 from the body 32 of the tag 30 such that the arm 35 and tab 37 are free to be moved. A crescent-shaped aperture 36 is provided adjacent the aperture 26 such that the tab 37 can be fitted within the aperture 36 in much the same manner as shown in FIG. 2 when attaching the tag 30 to an object.

Figures 4, 5:
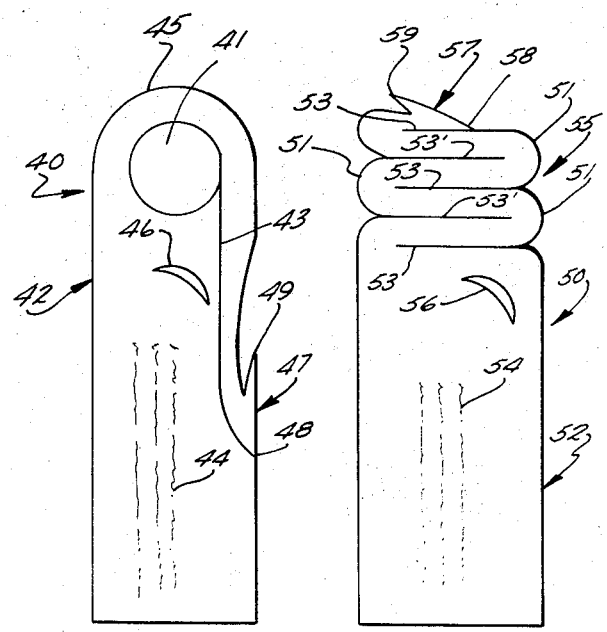
FIG. 4 is an alternative embodiment of the present invention in which the arm is extended down one side of the tag to provide a still longer arm.
FIG. 5 illustrates still a further embodiment in which the arm is formed at one end of the tag in a convoluted manner such that an even longer arm is obtained thereby so the tag may be attached to a relatively large object.

FIG. 4 shows an alternative embodiment of the present invention comprising a tag 40 which includes a relatively long body portion 42 with information 44 thereon and including an aperture 41 formed at one end. An arm 45 is formed by a portion of the periphery of the boundary around aperture 41 and extends down one side of the body 42 such that it circumscribes the portion of the body. A cut or slot 43 in the body 42 separates the arm 45 from the body 42 such that the arm 45 and a tab 47 at the end thereof are free to be moved. The tab is barbed-shaped and includes a point 48 and a projecting member 49. A crescent-shaped aperture 46 is formed in the body 42 adjacent the aperture 41 to receive the tab 47. It is seen that by forming an arm 45 which circumscribes a greater portion of the body 42 than the previous embodiments, the tag can be attached to objects having greater diameters since the arm is considerably longer. Although the arm 45 of the tag shown in FIG. 4 circumscribes only a portion of the tag, it could continue around the periphery of the tag for any desired length.

FIG. 5 shows another embodiment of the present invention comprising a tag 50 with a main body portion 52 to which is attached a convoluted arm portion 55. Information 54 can be printed or written upon the tag body 52 as in the other embodiments. In the embodiment shown in FIG. 5 the arm which extends around an object for attaching the tag thereto is formed from a plurality of convolutions 51 each of which are formed by alternate slots 53 and 53' at one end of body 52 of the tag and extending inwardly from opposite edges. A barbed-shaped tab 57 has a point 58 and a projection 59 thereon adapted to fit within a crescent-shaped aperture 56 formed in the upper corner of the tag 50 as shown. In the embodiment of FIG. 5 it is seen that the arm 55 formed by the convoluted portions 51 can be extended in accordion-like fashion to encircle relatively large objects. Any number of convolutions can be formed in the tag 50 in the same manner as shown to provide an arm of a desired length. The tab 57 is fitted in the crescent-shaped aperture 56 in the same manner as explained above to securely attach the tag to an object.

The tags of the various embodiments can be packaged as a kit together with a marking pen having light-resistant ink to prevent fading of information printed on the top when attached to a plant and exposed to sunlight.

Various modifications of the embodiments of the invention will be apparent to those skilled in the art but which fall within the scope of the present invention as defined by the appended claims.

I claim:

1. A tag adapted to be attached to an article such as a branch or the like, said tag comprising:
a body formed of planar stock, said body including a first aperture adjacent onv end of said body to define an arm, said first aperture having a dimension sufficiently large to encompass an article to which said tag is to be attached, said body including a slot extending from an edge of said first aperture to the periphery of said body to define a free end of said arm, said free end of said arm including a projection adjacent the end to form a barb, said body including a second aperture spaced from said first aperture and shaped to receive and hold the barbed end of said arm to hold said tag in place on an article when said arm is extended around the article and the barbed end of said arm inserted into said second aperture.

2. The tag as defined in claim 1 wherein said slot defines a tapered free end of said arm which extends generally toward said second aperture to facilitate insertion therein.

3. The tag as defined in claim 2 wherein said first aperture includes a curved portion defining a curved arm.

4. The tag as defined in claim 3 wherein said first aperture is shaped to define said projection on said arm, which projection extends generally toward said first aperture.

5. The tag as defined in claim 4 wherein said second aperture is crescent-shaped to securely hold the barbed end of said arm when inserted therein.

6. The tag as defined in claim 5 wherein said slot extends substantially between at least portions of said first and second apertures.

* * * * *